(12) United States Patent
Park et al.

(10) Patent No.: US 10,086,599 B2
(45) Date of Patent: Oct. 2, 2018

(54) LABEL PEELER SYSTEM FOR PRINTERS AND METHODS FOR MAKING AND USING SAME

(71) Applicant: WARD KRAFT, INC., Fort Scott, KS (US)

(72) Inventors: Don Park, Fort Scott, KS (US); Randy Zimmerman, Fort Scott, KS (US)

(73) Assignee: WARD KRAFT, INC., Fort Scott, KS (US)

( * ) Notice: Subject to any disclaimer, the term of this patent is extended or adjusted under 35 U.S.C. 154(b) by 0 days.

(21) Appl. No.: 15/460,430

(22) Filed: Mar. 16, 2017

(65) Prior Publication Data

US 2017/0266944 A1 Sep. 21, 2017

Related U.S. Application Data

(60) Provisional application No. 62/309,089, filed on Mar. 16, 2016.

(51) Int. Cl.
| | |
|---|---|
| *B32B 43/00* | (2006.01) |
| *B32B 38/10* | (2006.01) |
| *B32B 38/00* | (2006.01) |
| *B65C 9/18* | (2006.01) |
| *B65C 9/00* | (2006.01) |

(52) U.S. Cl.
CPC ............ *B32B 43/006* (2013.01); *B32B 38/10* (2013.01); *B32B 38/145* (2013.01); *B65C 9/0006* (2013.01); *B65C 9/1865* (2013.01); *B32B 2519/00* (2013.01); *B65C 2009/0009* (2013.01); *Y10T 156/1195* (2015.01); *Y10T 156/1994* (2015.01)

(58) Field of Classification Search
CPC ............. B32B 43/006; Y10T 156/1195; Y10T 156/1994; B65C 9/1865; B65C 9/0006; B65C 2009/0009
See application file for complete search history.

(56) References Cited

U.S. PATENT DOCUMENTS

| | | | | |
|---|---|---|---|---|
| 3,547,745 | A | * 12/1970 | Winston | .................. B31B 70/00 156/719 |
| 4,068,028 | A | 1/1978 | Samonides et al. | |
| 5,158,642 | A | * 10/1992 | Koike | ................... B65C 9/0006 156/719 |
| 5,431,763 | A | 7/1995 | Bradshaw | |
| 5,660,663 | A | 8/1997 | Chamberlain et al. | |
| 5,730,816 | A | 3/1998 | Murphy | |

(Continued)

*Primary Examiner* — Mark A Osele
(74) *Attorney, Agent, or Firm* — Lathrop Gage L.L.P.

(57) ABSTRACT

A label peeler system includes a first outer bracket having a first angled surface and a second outer bracket having a second angled surface. The label peeler system comprises a first movable bracket pivotably coupled to the first outer bracket and a second movable bracket pivotably coupled to the second outer bracket. A peel bar is secured to the first angled surface and the second angled surface, and a peel roller is rotatably disposed above the peel bar. A first roller is rotatably coupled to the first outer bracket and the second outer bracket. A second roller is rotatably coupled to the first movable bracket and the second movable bracket. The first roller and the second roller are configured to collectively pull the liner away from the label after the label is peeled by the peel bar.

20 Claims, 9 Drawing Sheets

(56) References Cited

U.S. PATENT DOCUMENTS

| | | | |
|---|---|---|---|
| 5,741,381 A | 4/1998 | Dolence et al. | |
| 5,885,406 A | 3/1999 | Tiefel | |
| 5,897,741 A | 4/1999 | Mills et al. | |
| 5,972,155 A | 10/1999 | Cooprider et al. | |
| 6,349,756 B1 * | 2/2002 | Brough | B29C 63/0013 156/247 |
| 6,527,026 B1 * | 3/2003 | Huggins | B65C 11/0289 156/387 |
| 6,766,844 B1 * | 7/2004 | Watkins | B32B 43/006 101/288 |
| 6,786,263 B1 | 9/2004 | Fox, Jr. et al. | |
| 7,121,313 B2 * | 10/2006 | Ito | B41J 3/4075 156/767 |
| 7,387,459 B2 * | 6/2008 | Liu | B41J 3/36 101/288 |
| 7,779,885 B2 * | 8/2010 | Takami | B65C 11/0289 156/221 |
| 8,925,613 B2 * | 1/2015 | Sato | B65C 9/0006 156/715 |

\* cited by examiner

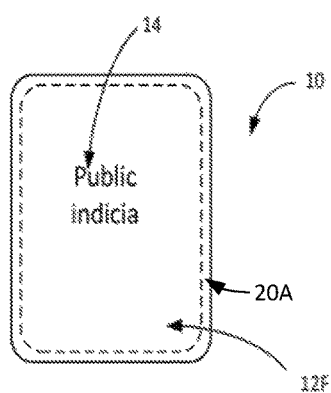
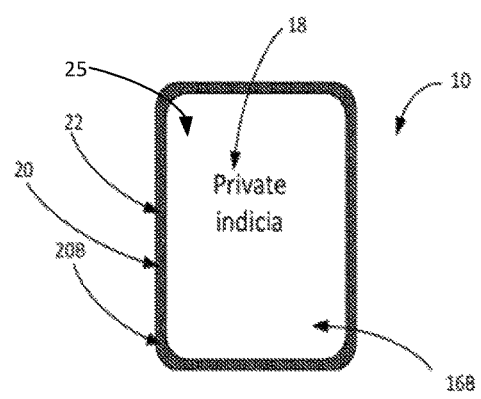
FIG. 1
FIG. 2

LABEL PEELER SYSTEM FOR PRINTERS AND METHODS FOR MAKING AND USING SAME

RELATED APPLICATIONS

This application claims priority to U.S. Provisional Patent Application, Ser. No. 62/309,089 entitled "Label Peeler System for Printers", filed Mar. 16, 2016, the disclosure of which is incorporated by reference herein in its entirety.

FIELD OF THE DISCLOSURE

The disclosure relates generally to the field of label peelers. More specifically, the disclosure relates to a label peeler system for use with a printer.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

According to an embodiment, a label peeler system comprises a first outer bracket having a first angled surface and a second outer bracket having a second angled surface. The peeler includes a first movable bracket pivotably coupled to the first outer bracket, and a second movable bracket pivotably coupled to the second outer bracket. A peel bar is secured to the first angled surface and the second angled surface, and a peel roller is rotatably disposed above the peel bar. The peeler includes a first roller and a second roller. The first roller is rotatably coupled to the first outer bracket and the second outer bracket. The second roller is rotatably coupled to the first movable bracket and the second movable bracket. The peeler further comprises a catch tray. The peel bar peels a label from a liner and the first roller and the second roller collectively pull the liner away from the peeled label. The peeled label is deposited in the catch tray.

According to another embodiment, a label peeler system comprises an outer bracket and an inner bracket pivotably coupled to the outer bracket. The peeler system comprises a peel bar secured to the outer bracket, and a peel roller. The peeler system includes a first roller rotatably coupled to the outer bracket, and a second roller rotatably coupled to the inner bracket. A latch plate is secured to the inner bracket. The peeler system has a catch tray for retaining a label after it has been peeled from a liner.

According to yet another embodiment, a label peeler system for peeling a label from a liner is provided. The label has a central portion surrounded by a border portion. The liner has a void corresponding to the central portion and a perimeter portion corresponding to the border portion. The label peeler system includes a first outer bracket having a first angled surface and a second outer bracket having a second angled surface. The label peeler system comprises a first movable bracket pivotably coupled to the first outer bracket and a second movable bracket pivotably coupled to the second outer bracket. A peel bar is secured to the first angled surface and the second angled surface, and a peel roller is rotatably disposed above the peel bar. A first roller is rotatably coupled to the first outer bracket and the second outer bracket. A second roller is rotatably coupled to the first movable bracket and the second movable bracket. The first roller and the second roller are configured to collectively pull the liner away from the label after the label is peeled by the peel bar.

BRIEF DESCRIPTION OF THE SEVERAL VIEWS OF THE DRAWINGS

Illustrative embodiments of the present disclosure are described in detail below with reference to the attached drawing figures and wherein:

FIG. 1 is a top view of a label for use with a peeling system, according to an embodiment of the present disclosure;

FIG. 2 is a bottom view of the label of FIG. 1;

DETAILED DESCRIPTION

Figure 3:
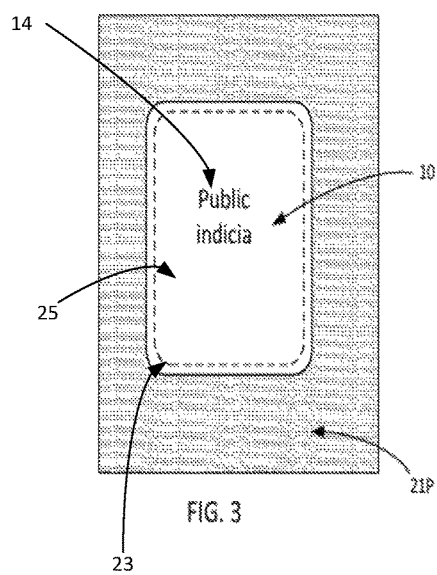
FIG. 3 is a top view of a package after the label of FIG. 1 is adhered thereto.

A conventional label assembly typically includes a printable label and a liner. The printable label has adhesive disposed on its bottom face. The liner has a coating of release material on its upper face. The liner is removably secured to the label such that the adhesive is in contact with the release material. The label is typically printed in a printer before the liner is removed therefrom, as otherwise, the adhesive on the label may impede the passage of the label through the printer. When the label is to be adhered to an object (e.g., a package), the entire label assembly (i.e., the printed label and the liner) is first removed from the printer. The liner is then manually separated from the label to expose the adhesive. The liner is discarded, and the label is adhered to the object.

The artisan understands that in the shipping and label printing industries, time may be of the essence, particularly where large volumes of labels are printed and applied to objects in assembly line environments. Manual removal of the liner from the label after the label printing process, and the discarding thereof, takes valuable time, which in-turn reduces the number of labels that can be adhered to objects in a given time period. It may be desirable to automate the liner peeling process so that the label, once it exits the printer, is ready to be adhered to an object. The peeler system disclosed herein may, among other things, allow for such.

FIG. 1 shows an example label 10 for use with a peeling system (e.g., peeling system 200 shown in FIG. 8 and described below), according to an example embodiment of the present disclosure. The label 10 may have a front side 12F on which indicia 14 may be printed. The indicia 14 on the front side 12F of the label 10 may be of a non-sensitive nature, and may include, for example, the name and address of a recipient of a package to which the label 10 is to be adhered. The indicia (e.g., the public indicia 14) may be printed on the label 10 using a printer (e.g., printer 300 shown in FIG. 10). The printer 300 may be a direct thermal, thermal transfer, laser, or any other kind of printer, whether now known or subsequently developed.

FIG. 2 shows a back side 16B of the label 10 after it has been separated from a web 120 (FIG. 5), as discussed below. The back side 16B of the label 10 may, in embodiments, also have indicia 18 printed thereon. The indicia 18 on the back side 16B of the label 10 may be of a sensitive nature. For example, the private indicia 18 may include a packing list listing the items in a package to which the label 10 is to be adhered, pricing information, or other such information that the recipient of the package would not want made public.

The label 10 may have a border 20. A back side 20B of the border 20 is visible in FIG. 2 (and a front side 20A thereof can be seen in FIG. 1). The border 20 may surround a central portion 25 of the label 10, and at the back side 20B, have adhesive 22. As shown in FIG. 3, the label 10 may be adhered to a package 21P or other object using the adhesive 22 on the back side 20B of the border 20 of the label 10, such that the public indicia 14 is visible and the private indicia 18 is hidden on the underside.

Figure 4:
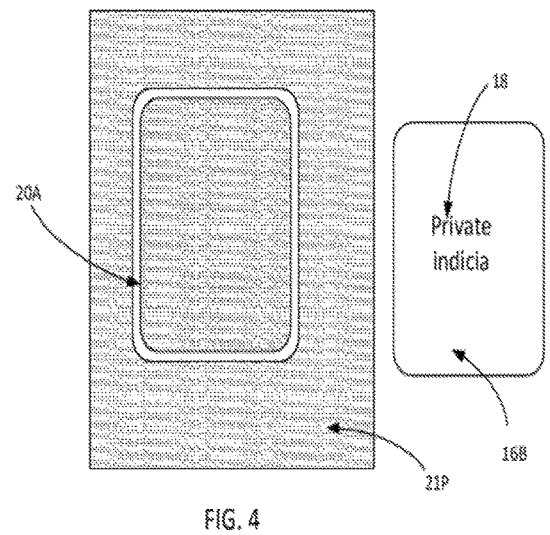
FIG. 4 is a top view of the package of FIG. 3 after the label has been removed therefrom by an end user.

In an embodiment, the border 20 may comprise a tearing mechanism 23, such as perforations, a tear strip, or other means to allow the recipient of the package 21P to tear the central portion 25 of the label 10 from the border 20. As shown in FIG. 4, once the recipient of the package 21P receives the package 21P, he may separate the central portion 25 of the label 10 from the border 20 using the tearing mechanism 23, leaving the border 20 adhered to the package 21P such that the border front side 20A remains visible. The recipient may, in this way, access the private indicia 18 on the back side 16B of the label 10 (and more specifically, on the back side of the central portion 25). In some embodiments, the private indicia 18 may not be private per se, but may include a return address of the shipper or other such indicia.

Figure 5:
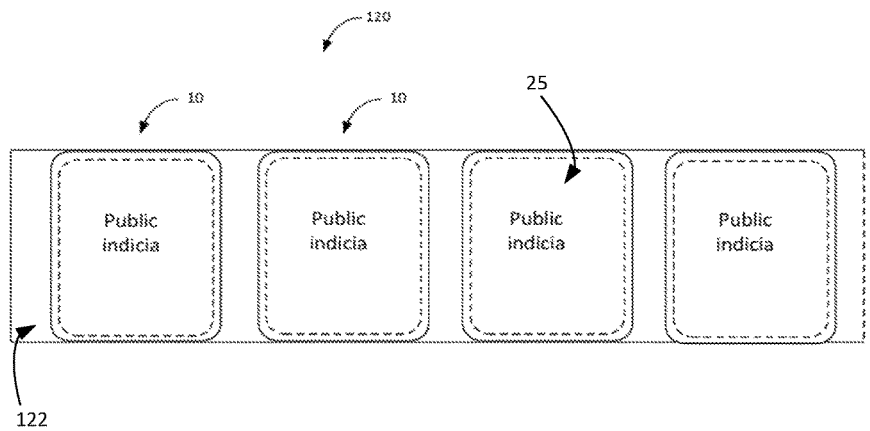
FIG. 5 is a top view of a web of label stock.
Figure 6:
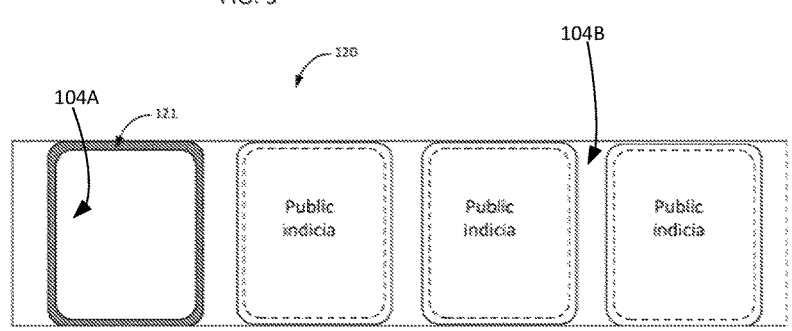
FIG. 6 is a top view of the web of label stock of FIG. 5 after one label has been removed therefrom.

FIGS. 5 and 6 show a web 120 of the labels 10 for use with the peeler system 200 described below, according to an embodiment. The web 120 may contain a plurality of labels 10 disposed atop (e.g., removably secured to) a solitary backing layer or matrix 104 (see FIG. 7). The backing layer 104 may comprise openings 104A and connecting portions 104B that extend between the openings 104A. The size of each opening 104A may generally correspond to the central portion 25 of one label 10.

The connecting portions 104B of the matrix 104 may include perimeter portions 121 (FIG. 5). Each opening 104A may be surrounded by one perimeter portion 121. The perimeter portion 121 may contain release material, such as silicone or another release material. The size of the perimeter portion 121 may generally correspond to the size of the border 20 (FIG. 2) of the label 10. Each label 10 may be removably secured to the backing layer 104 such that the border back side 20B of the label 10, and specifically the adhesive 22 thereof, is in contact with the release material of the perimeter portion 121. The label 10, when removably secured to the backing layer 104 in this fashion, may temporarily close the opening 104A.

Figure 7:
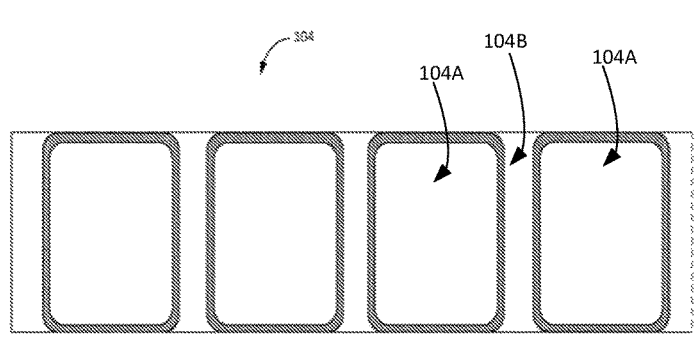
FIG. 7 is a top view of a matrix of the web of label stock of FIG. 5 after a plurality of labels have been removed from the web.

The label 10 may be printed while it is removably secured to the backing layer 104 (or, in some embodiments, after the label 10 has been disassociated from the backing layer 104). Removal of the label 10 from the backing layer 104, and specifically from the perimeter portion 121 thereof, may expose the opening 104A. FIG. 7 shows the backing layer 104 after a plurality of labels 10 (specifically each of the four labels 10 of FIG. 5) have been removed therefrom, exposing as many openings 104A. This configuration of the backing layer 104 may be advantageous as compared to prior art liner webs that fully cover the underside of the label, at least because of the material savings that are realized by virtue of the openings 104A. The artisan will understand that the label 10 on the label web 120 is merely one example of a type of label that may be separated from an associated backing layer using the peeler system 200. For example, in embodiments, the peeler 200 may be used to separate a multi-ply label (comprising, e.g., a printable face stock ply and a printable liner ply) from a perimeter portion of the printable liner ply. The peeler 200 may likewise be used to peel other labels from their respective liner portions such that the labels are deposited in a catch tray (discussed further below) ready for use.

Figure 8:
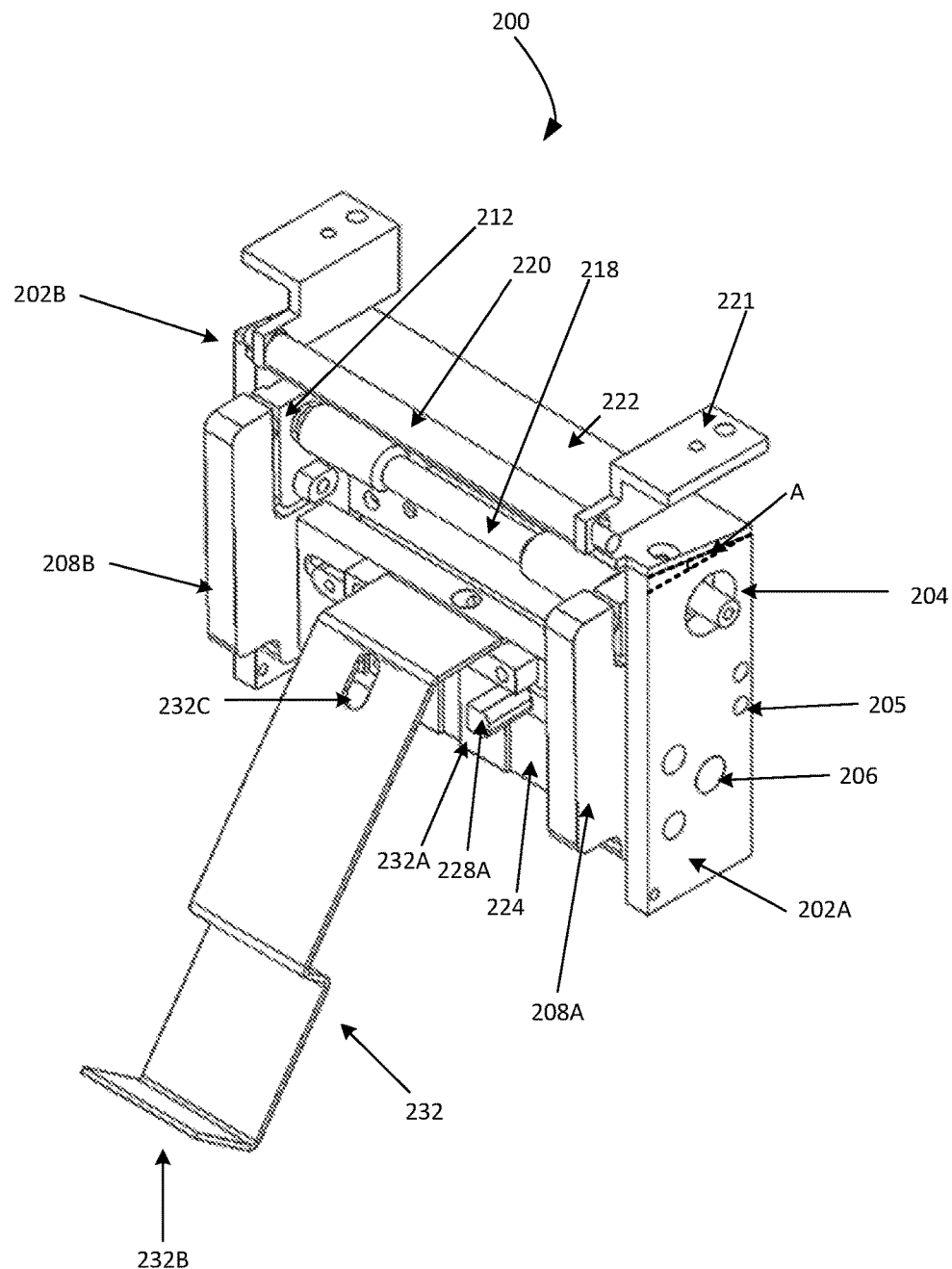
FIG. 8 is a perspective view of a peeler system, according to an embodiment of the present disclosure.
Figure 9:
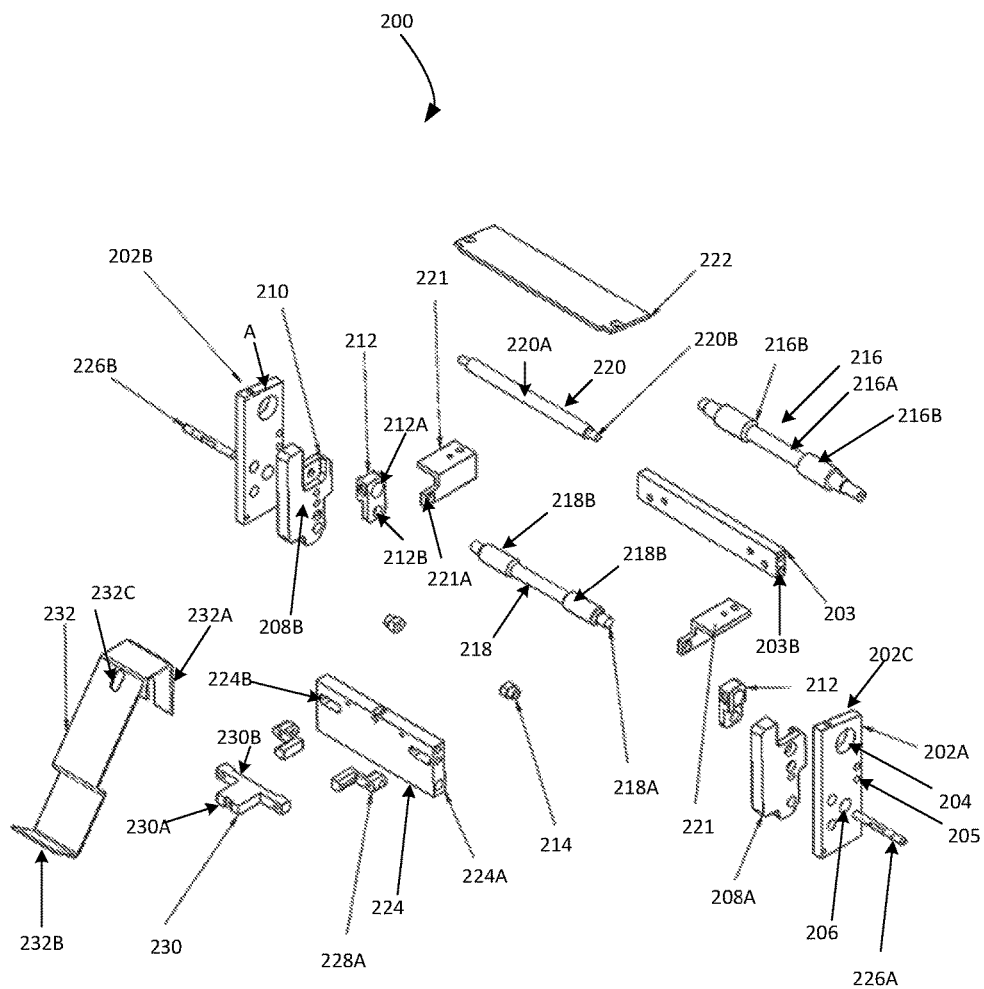
FIG. 9 is an exploded view of the peeler system of FIG. 8.

FIG. 8 shows the peeler system 200 (without the printer to which system 200 is coupled) according to an example embodiment, and FIG. 9 shows an exploded view thereof. The peeler 200 may have a stationary first (or a right) outer bracket 202A and a stationary second (or a left) outer bracket 202B that may be generally identical to the first outer bracket 202A. Each bracket 202A, 202B may have a shaft receiving opening 204, one or more lock receiving openings 205, and one or more pin receiving openings 206 that each extend through the bracket body. The shaft receiving opening 204 may, in embodiments, have a diameter that is greater than a diameter of each of the lock receiving openings 205 and the pin receiving openings 206.

The outer brackets 202A and 202B may be generally rectangular, or take on other regular or irregular shapes. In an embodiment, each outer bracket 202A, 202B may have an angled upper surface 202C (see FIG. 9). The angled upper surfaces 202C of the outer brackets 202A, 202B may form an angle A with the horizontal plane (see FIG. 8). In embodiments, the angled upper surfaces 202C of the outer brackets 202A, 202B may form an angle A of between two degrees and thirty degrees with the horizontal plane. More preferably, the angle A formed by the angled upper surface 202C with the horizontal plane may be between four degrees and fifteen degrees, and may, in an embodiment, be eight degrees. The angled upper surfaces 202C of the outer brackets 202A, 202B may have secured thereto a peel bar, as discussed below. The angle A of the angled upper surfaces 202C may cause the peel bar secured to the angled upper surfaces 202C to make a corresponding angle with a horizontal plane. It has been found that extension of the peel bar at the angle A facilitates the peeling of the label 10 from the web 120 (as compared to a peel bar that extends parallel to the ground).

The outer brackets 202A and 202B may be indirectly coupled to each other via a bracket dead bar 203 (FIG. 9). The bracket dead bar 203, in an embodiment, may be generally rectangular and include lock receiving openings 203B that correspond to the lock receiving openings 205 in the outer brackets 202A, 202B when the bracket dead bar 203 is disposed adjacent the brackets 202A, 202B such that it extends laterally therebetween. A lock may be passed through the lock receiving opening 205 in the bracket 202A and the corresponding lock receiving opening 203B in the dead bar 203 on one side, and another lock may be passed through the lock receiving opening 205 in the bracket 202B and the corresponding lock receiving opening 203B in the dead bar 203 on the other side. The outer brackets 202A, 202B, coupled to the dead bar 203, may collectively be referred to herein as a frame of the peeler 200.

A first movable (or pivotable or inner) bracket 208A may be pivotably coupled to the first outer bracket 202A, and a second movable (or pivotable or inner) bracket 208B may be pivotably coupled to the second outer bracket 202B. Each pivotable bracket 208A, 208B may include a recessed portion 210 (see FIG. 9), which, in an embodiment, may be generally rectangular. Each recessed portion 210 may be configured to receive a nip arm 212 (FIG. 9).

Each of the two nip arms 212 (i.e., the nip arm 212 disposed within the recessed portion 210 of the first pivotable bracket 208A and the nip arm 212 disposed within the recessed portion 210 of the second pivotable bracket 208B) may include an upper nip shaft receiving opening 212A and a lower stud receiving opening 212B. A nip shaft 218 (discussed below) may be rotatably disposed within the nip shaft receiving openings 212A of the two nip arms 212 coupled to the pivotable brackets 208A, 208B. The stud receiving opening 212B of each of nip arm 212 may be configured to receive a stud 214.

The peeler 200 may include a first (or a driven) shaft 216. The first shaft 216 may, in embodiments, have a generally cylindrical body 216A, and two generally cylindrical sleeves (or covering portions) 216B that are disposed proximate each end of the first shaft body 216A. In embodiments, the first shaft body 216A may be made of metal, metal alloys, plastic, etc., and the sleeves 216B may be made of rubber or other suitable materials. The first shaft 216 may be rotatably disposed within the shaft receiving openings 204 of the first and the second outer brackets 202A, 202B. When the first shaft 216 is rotatably coupled to the outer brackets 202A, 202B in this way, one end of the first shaft 216 may extend through the shaft receiving opening 204 of the first outer bracket 202A and the other end of the first shaft 216 may extend through the shaft receiving opening 204 of the second outer bracket 202B. The first shaft 216, in embodiments, may further be operably coupled to a printer (e.g., to a roller, pulley, gearing mechanism, etc., thereof) such that the shaft 216 is caused to be driven (i.e., rotated) by the printer to which the peeler 200 is attached.

The peeler system 200 may comprise a second shaft (or nip roller) 218. The nip shaft 218 may also include a generally cylindrical body 218A and two generally cylindrical sleeves (or covering portions) 218B that are disposed proximate each end of the nip shaft body 218A. The nip roller 218 may be rotatably coupled to the two nip arms 212 via the nip shaft receiving openings 212A thereof. The nip shaft 218 may, in embodiments, be spring loaded. In an embodiment, all or part of the nip shaft 218 may be coated with release material, such as silicone or another release material. While not required, all or part of the first shaft 216 may also, in embodiments, be coated with release material. As discussed herein, the first shaft 216 and the nip shaft 218 may operate together to allow the label matrix 104 to be conveniently discarded after the label(s) 10 have been separated from the web of labels 120.

The peeler system 200 may include a peel roller 220. The peel roller 220 may have a generally cylindrical body 220A and generally cylindrical end portions 220B. A diameter of the peel roller end portions 220B may, in embodiments, be smaller than a diameter of the peel roller cylindrical body 220A. The peel roller 220 may be rotatably coupled to roller arms 221. Specifically, the peeler 200 may include two roller arms 221, and each roller arm 221 may accommodate one end portion 220B of the peel roller 220. More specifically, each roller arm 221 may include an opening 221A that is configured to receive one end portion 220B of the peel roller 220 such that the peel roller 220 can rotate within the openings 221A. In embodiments, a diameter of the roller arm openings 221A may be greater than a diameter of the peel roller end portions 220B. Such may allow the peel roller 220 to have some play as it rotates within the roller arm openings 221A.

A peel bar 222 may be secured to the angled upper surfaces 202C of the outer brackets 202A, 202B such that it is beneath the peel roller 220 and above the first roller 216. As noted, the angle A of the angled upper surfaces 202C (e.g., an eight degree angle) with respect to the horizontal plane may cause the peel bar 222 to also extend at the angle A.

The peeler 200 may have a latch plate 224, which may be generally rectangular as shown or take on other regular or irregular shapes. In an embodiment, each of the side surfaces of the latch plate 224 may include at least one pin receiving openings 224A. Two thumb lever receiving openings 224B may further extend through the front surface of the latch plate 224 proximate each side surface thereof. Each thumb lever receiving opening 224B may be configured to receive a thumb lever 228A.

The first and second pivotable brackets 208A, 208B, which are pivotably coupled to the right and left outer brackets 202A and 202B, respectively, may each be secured to an opposing end of the latch plate 224. More specifically, a first locking pin 226A may be sequentially passed through the pin receiving opening 206 of the right outer bracket 202A, the corresponding opening in the first pivotable bracket 208A, and through one of the pin receiving openings 224A in the latch plate 224. Similarly, a second locking pin 226B may be sequentially passed through the pin receiving opening 206 of the left outer bracket 202B, the corresponding opening in the second pivotable bracket 208B, and through the other pin receiving opening 224A in the latch plate 224.

One thumb lever 228A may be secured within each of the thumb lever receiving openings 224B of the latch plate 224. Moreover, in an embodiment, a catch arm sensing bracket 230 may be coupled to the latch plate 224 adjacent (e.g., above) the thumb levers 228A or elsewhere. The catch arm sensing bracket 230 may have a sensor receiving portion 230A and a recessed catch arm attachment portion 230B. A catch arm 232 may be operably coupled to the latch plate 224 via the catch arm sensing bracket 230.

In more detail, the catch arm 232 may have a hook portion 232A, a label receiving portion 232B, and a label sensing opening 232C that extends through the body of the catch arm 232. The catch arm 232 may be operably coupled to the latch plate 224 such that the catch arm hook portion 232A is sandwiched between the recessed catch arm attachment portion 230B of the catch arm sensing bracket 230 and the latch plate 224. A sensor (e.g., an infrared or other proximity detector as discussed below) may be coupled to the sensor receiving portion 230A of the catch arm sensing bracket 230. This sensor on the catch arm sensing bracket 230 may sense the presence of a label 10 on the catch arm 232 through the label sensing opening 232C in the catch arm 232.

Figure 10:
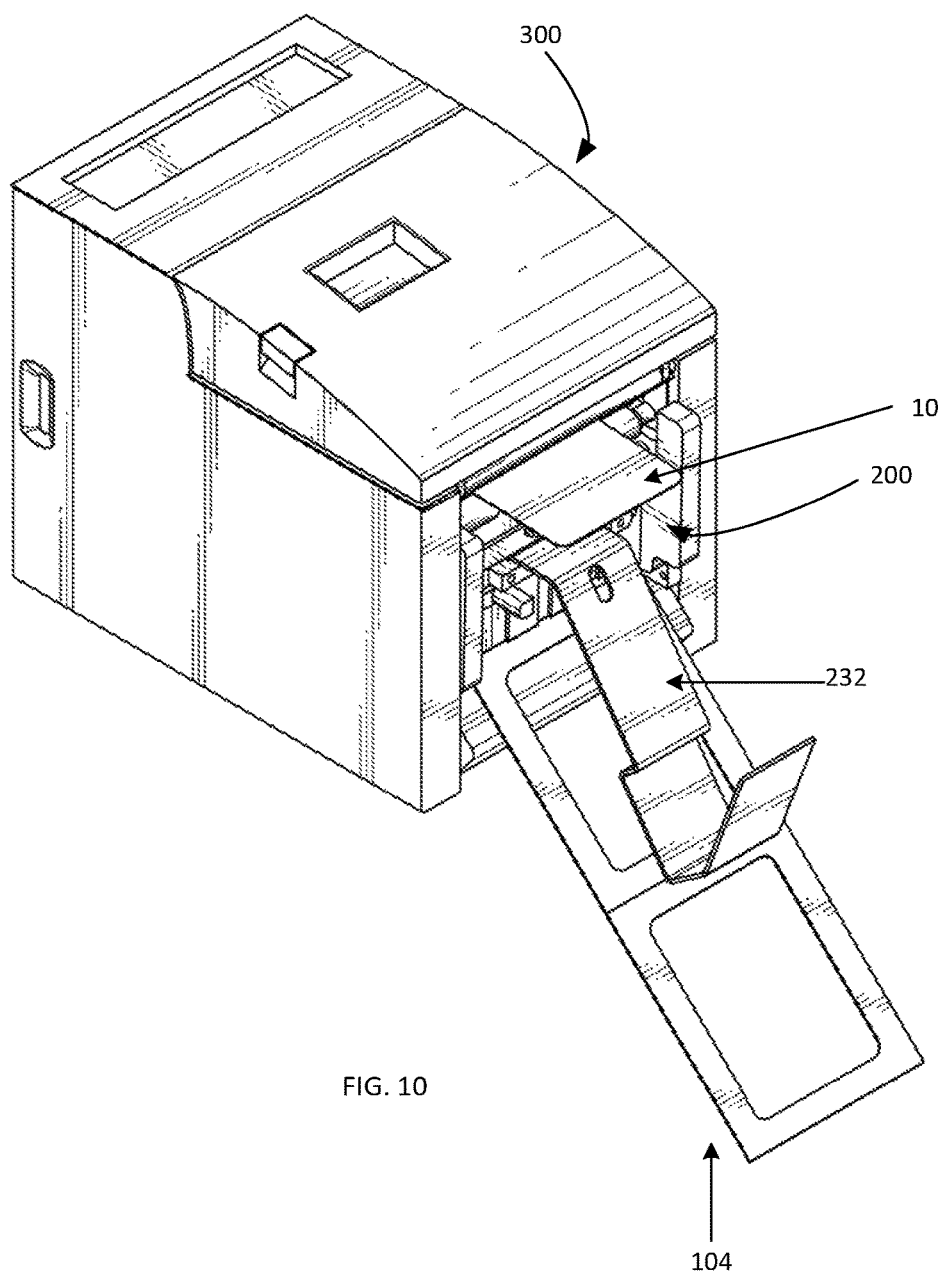
FIG. 10 is a perspective view of a printer to which the peeler system of FIG. 8 is operably coupled.

The peeler 200 may be operably coupled to the printer 300 (see FIG. 10). As noted, the first shaft 216 of the peeler system 200 may be driven by the printer 300 (or, in some embodiments, by other means, such as an external motor or other driver). For example, the first shaft 216 may be operably secured to a roller, pulley, gearing mechanism, etc., of the printer 300 so that the first shaft 216 is caused to be rotated by the printer 300 to which the peeler 200 is coupled. In some embodiments, the first shaft 216 may have associated therewith a one way bearing so that the first shaft 216 is driven only in a solitary direction to pull the label web out of the printer 300. For instance, in an embodiment, the first shaft 216 may be caused to be rotated by the printer 300 (or other means, such as a motor) only in a forward direction (e.g., a counter clockwise direction); in these embodiments, the first shaft 216 may be able to rotate in the reverse (e.g., clockwise direction) direction, but may do so only when idling (e.g., when the label web 120 is pulled backwards). The printer 300 may be a direct thermal, thermal transfer, laser, or any other kind of printer; in one embodiment, the printer 300 may be a commercially available table top printer, such as the SATO GY412T, or another printer. The printer 300 may, in embodiments, allow for double sided printing on the label 10.

Figure 11:
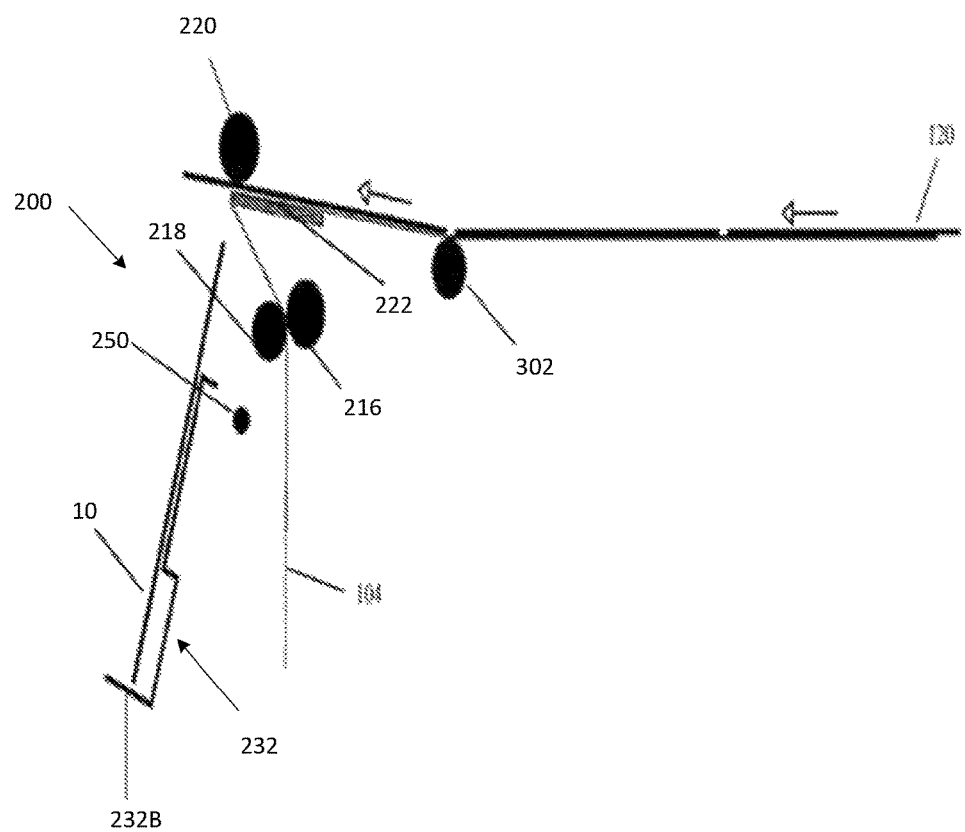
FIG. 11 is a schematic illustrating the peeler system in use.

FIG. 11 schematically illustrates the process whereby the web 120 (which comprises the labels 10 secured to a matrix layer 104, as shown in FIGS. 5-6) moves through the peeler system 200. The web 120 may move in a stream that is driven by a printer shaft 302 of the printer 300, out of the printer 300 upon printing, and between the peel bar 222 and the peel roller 220. The peel roller 220 may (but need not) be spring loaded, and may rotate within the openings 221A of the roller arms 221. As noted, a diameter of the roller arm openings 221A may be greater than a diameter of the peel roller end portions 220B, which may allow the peel roller 220 to have some play as it rotates within the roller arm openings 221A. The peel roller 220 may effectively function as an iron, and by virtue of gravity, put pressure on the web 120 to avoid curling of the web 120 as it moves through the peeler system 200. The play in the peel roller 220 may enable the roller 220 to function as desired notwithstanding any irregularities in the thickness of the web 120.

As the web 120 moves through the peeler system 200, the angled peel bar 222 may peel the label 10 off the web 120 (see also, FIG. 7, showing the matrix 104 with void spaces 104A after the labels 10 have been peeled off the web 120 by the peel bar 222). The label 10, now separated from the web 120, may drop into the catch arm 232 and may be supported by the label receiving portion 232B thereof. Alternately, the label 10, now ready to be applied to an object (e.g., to the package 21P, see FIG. 3), may be routed elsewhere so it can be retrieved and conveniently secured to the package 21P. The matrix 104 (i.e., the web 120 sans the labels 10) may, in embodiments, be pulled away from the separated label 10 by the one way nip shaft (or roller) 218 and the driven shaft (or first shaft or roller) 216. FIG. 10 shows the label 10 as it is about to drop into the catch tray 232 (after it has been separated from the web 120) and also shows the matrix 104 being routed beneath the catch tray 232. The matrix 104, e.g., a portion thereof, may eventually be torn and discarded. In some embodiments, the matrix 104 may be routed to a recycling or other receptacle (e.g., another catch tray) for convenient disposal. In some embodiments, the matrix 104 to be discarded may be rolled (using, e.g., a separate roller or otherwise) to facilitate the discarding thereof.

In an embodiment, the peeler 200 may include a sensor 250 (FIG. 11). The sensor 250 may be coupled to the catch arm sensing bracket 230 (see FIG. 9), and more specifically, to the sensor receiving portion 230A of the catch arm sensing bracket 230. The sensor 250 may be, for example, an infrared proximity detector or other suitable sensor that can sense the presence of the label 10 in the catch tray 232. The sensor 250 may transmit energy through the label sensing opening 232C of catch tray 232, and based on the reflection thereof, determine the presence or absence of a label 10 in the catch tray 232.

The sensor 250 may, in embodiments, be in data communication with the printer 300, and may be used to ensure that a label 10 is printed and dropped into the catch tray 232 only after the printed label 10 that was previously dropped into the catch tray 232 has been removed from the catch tray 232. Once one printed label 10 deposited into the catch tray 232 is removed, the sensor 250 may communicate with the printer 300 so that the next label 10 may be printed and deposited into the catch tray 232. In this way, the peeler system 200 may ensure that a label 10 is printed only after the prior label 10 has been removed from the catch tray 232. Such may prevent two (or more) labels 10 from being deposited into the catch tray 232 at once. The artisan will appreciate that depositing two or more peeled labels 10 in the catch tray 232 may be disadvantageous as the labels 10 may undesirably stick to each other by virtue of the adhesive 22.

Figure 12:
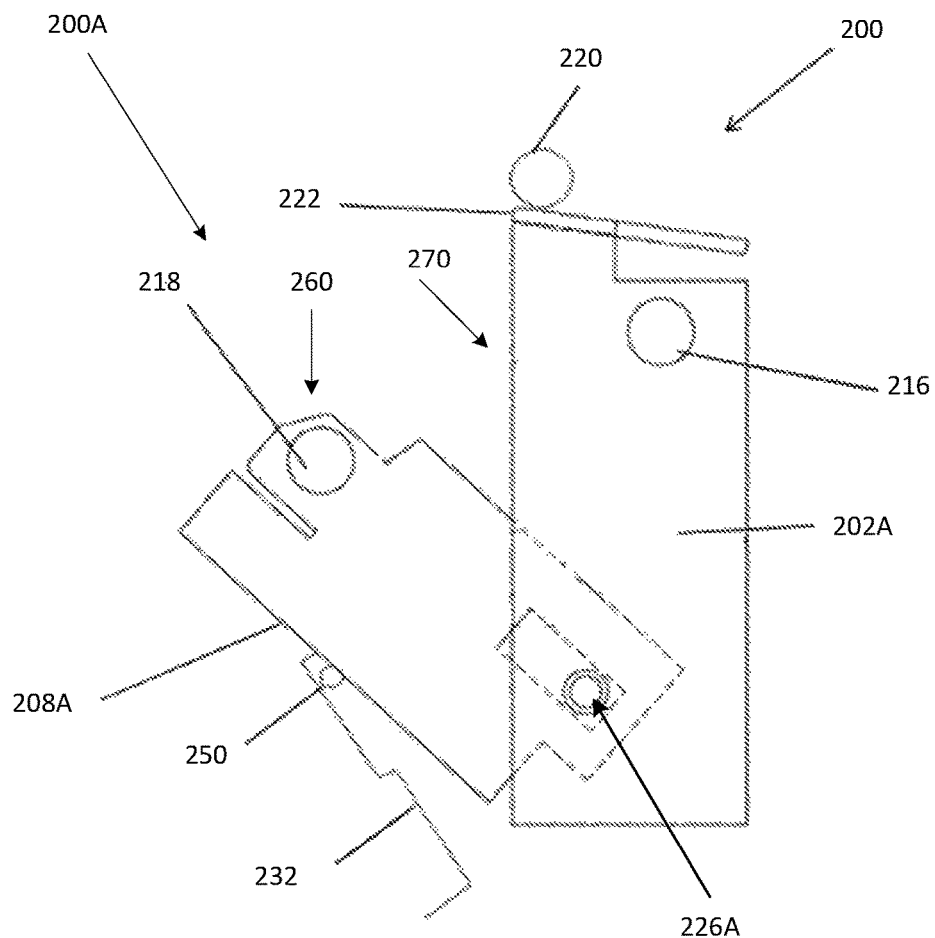
FIG. 12 is a schematic side view representation of the peeler system in an initial position.
Figure 13:
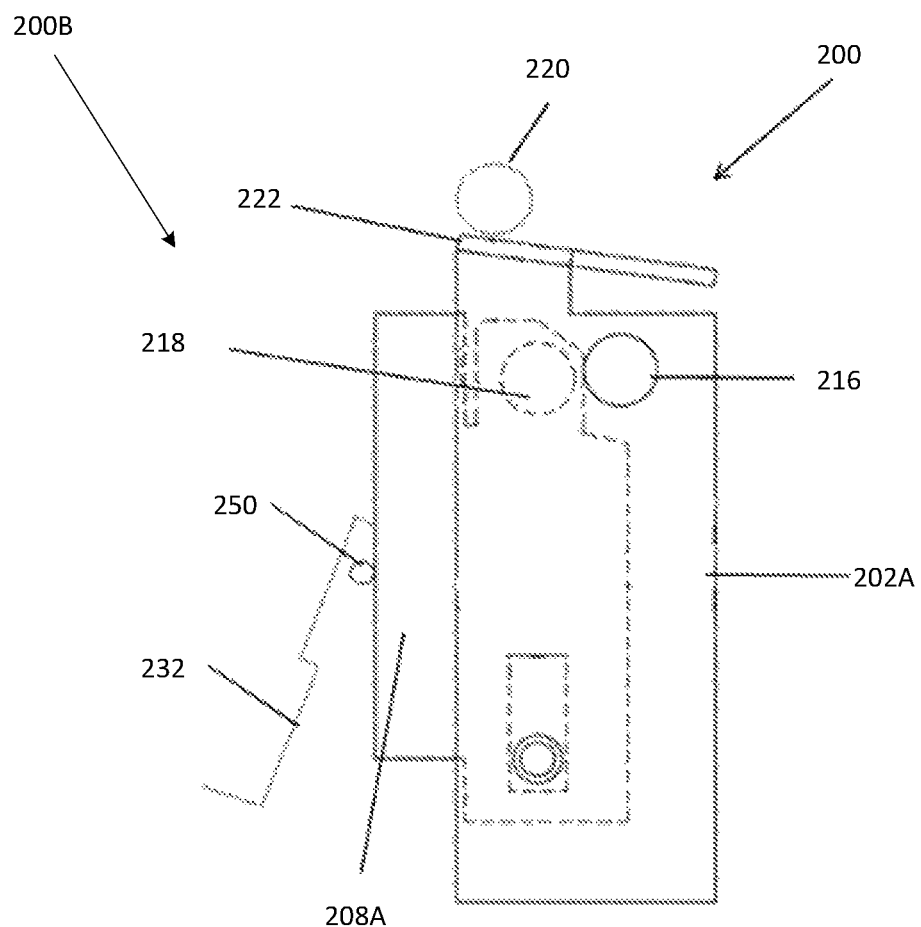
FIG. 13 is a schematic side view representation of the peeler system in an operating position.

FIG. 12 shows the peeler system 200 in an initial position 200A, and FIG. 13 shows the peeler system 200 in an operating position 200B. The peeler 200 may be placed in the initial position 200A for setup. Once the setup is complete, the peeler 200 may be placed in the operating position 200B to peel the labels 10 from the web 120, as discussed herein.

To place the peeler 200 in the initial position 200A, a first portion 260 of the peeler 200 may be pivoted open along the pins 226A and 226B and moved relative to (i.e., away from) a second portion 270 of the peeler 200. The first peeler portion 260 may include, for example, the first pivotable bracket 208A, the second pivotable bracket 208B, the latch plate 224 connecting the two pivotable brackets 208A, 208B, the nip arms 212, the nip roller 218, the catch tray 232, the catch arm sensing bracket 230, etc. The second portion 270 may include, for example, the outer brackets 202A, 202B, the dead bar 203, the peel plate 222, the peel roller 220, the peel roller arms 221, etc. In some embodiments, the peel roller 220 may further be openable (e.g., the peel roller 220 may be configured to be distanced (e.g., pivoted away) from the peel bar 222), and may be so opened in the initial position 200A. When the peeler 200 is in the initial position 200A, a leading end of the web 120 may be manually passed between the peel roller 220 and the peel bar 222, and pulled down adjacent the first roller 216. The first portion 260 may then be closed such that the web 120 (e.g., the matrix 104 thereof) is sandwiched between the nip roller 218 and the first roller 216. In embodiments where the peel roller 220 is pivotable, it may further be closed (i.e., brought proximate the peel bar 222) such that the web 120 is in contact with the peel bar 222 and the peel roller 220.

Once the setup is complete, peeling of the labels 10 from the web 120 may thereafter be automatic. Specifically, the peel bar 222 may peel the labels 10 off the web 120 so that the labels 10 may serially be deposited in the catch tray 232, and the label matrix 104 (i.e., the web 120 sans the labels 10) may continue to be pulled by the rollers 216, 218 and be subsequently discarded. Because the liner matrix 104 (i.e., the web 120 sans the label) is flimsy, it may tend to bow as it moves through the rollers 216 and 218. It has been found that if the rollers 216 and 218 do not include the cylindrical sleeves 216B and 218B, the bowing of the liner matrix 104 may cause it to unintentionally tear or jam the peeler 200. The cylindrical sleeves 216B and 218 on the rollers 216 and 218, respectively, may account for such bowing of the liner matrix 104 and ensure that the matrix 104 passes smoothly through the rollers 216, 218 as desired.

Thus, as has been described, the peeler 200 may desirably separate the labels 10 and the matrix 104 such that the labels 10 are deposited in the catch tray 232, ready for use. Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

The disclosure claimed is:

1. A label peeler system comprising:
   a first outer bracket having a first angled surface and a second outer bracket having a second angled surface;
   a first movable bracket pivotably coupled to said first outer bracket and a second movable bracket pivotably coupled to said second outer bracket;
   a peel bar secured to said first angled surface and said second angled surface;
   a peel roller rotatably disposed above said peel bar;
   a first roller rotatably coupled to said first outer bracket and said second outer bracket;
   a second roller rotatably coupled to said first movable bracket and said second movable bracket; and
   a catch tray;
   wherein, the peel bar peels a label from a liner and the first roller and the second roller collectively pull the liner away from said peeled label;
   wherein, said peeled label is deposited in said catch tray.

2. The label peeler of claim 1, further comprising a latch plate.

3. The label peeler of claim 2, wherein each of said first movable bracket and said second movable bracket is secured to said latch plate.

4. The label peeler of claim 3, further comprising a dead bar.

5. The label peeler of claim 4, wherein each of said first outer bracket and said second outer bracket is secured to said dead bar.

6. The label peeler of claim 1, wherein:
   said label includes a central portion; and
   said liner includes a void that corresponds to said central portion.

7. The label peeler of claim 6, wherein said catch tray comprises a hook portion, a label receiving portion, and an opening.

8. The label peeler of claim 7 further comprising a sensor; said sensor determining a presence of said peeled label on said label receiving portion through said opening.

9. The label peeler of claim 1, wherein said first roller comprises a cylindrical body and a pair of cylindrical sleeves.

10. The label peeler of claim 9, wherein said cylindrical body is made of metal and said pair of cylindrical sleeves are made of rubber.

11. The label peeler of claim 1, further comprising a nip arm; said nip arm being secured to said first movable bracket.

12. The label peeler of claim 1, wherein said first roller is driven by a printer to which said label peeler system is coupled.

13. A label peeler system comprising:
   an outer bracket;
   an inner bracket pivotably coupled to said outer bracket;
   a peel bar secured to said outer bracket;
   a peel roller;
   a first roller rotatably coupled to said outer bracket;
   a second roller rotatably coupled to said inner bracket;
   a latch plate secured to said inner bracket;
   a catch tray for retaining a label after it has been peeled from a liner by said peel bar; and
   a dead bar coupled to said outer bracket.

14. The label peeler system of claim 13, wherein said outer bracket includes an angled upper surface to which said peel bar is secured.

15. The label peeler system of claim 13, further comprising a printer for printing an indicia on said label before said label has been peeled from said liner.

16. The label peeler system of claim 13, further comprising a latch plate coupled to said inner bracket.

17. The label peeler system of claim 16, further comprising a catch arm sensing bracket coupled to said latch plate; said catch arm sensing bracket comprising a sensor configured to determine a presence of said label on said catch tray.

18. The label peeler system of claim 16 wherein said inner bracket is pivoted away from said outer bracket in an initial position.

19. A label peeler system for peeling a label from a liner, said label having a central portion surrounded by a border portion, said liner having a void corresponding to said central portion and a perimeter portion corresponding to said border portion, said label peeler system comprising:
   a first outer bracket having a first angled surface and a second outer bracket having a second angled surface;
   a first movable bracket pivotably coupled to said first outer bracket and a second movable bracket pivotably coupled to said second outer bracket;
   a peel bar secured to said first angled surface and said second angled surface;
   a peel roller rotatably disposed above said peel bar;
   a first roller rotatably coupled to said first outer bracket and said second outer bracket; and
   a second roller rotatably coupled to said first movable bracket and said second movable bracket;
   wherein, said first roller and said second roller are configured to collectively pull said liner away from said label after said label is peeled by said peel bar.

20. A label peeler system comprising:
   an outer bracket;
   an inner bracket coupled to said outer bracket;
   a peel bar;
   a peel roller;
   a first roller coupled to said outer bracket;
   a second roller coupled to said inner bracket;
   a latch plate coupled to said inner bracket;
   a catch tray for retaining a label after it has been peeled from a liner by said peel bar; and a catch arm sensing bracket coupled to said latch plate;
said catch arm sensing bracket comprising a sensor configured to determine a presence of said label on said catch tray.

* * * * *